United States Patent [19]
Hardee et al.

[11] Patent Number: 4,798,715
[45] Date of Patent: Jan. 17, 1989

[54] PRODUCING CHLORINE DIOXIDE FROM CHLORATE SALT

[75] Inventors: Kenneth L. Hardee, Middlefield; Anthony R. Sacco, Mentor, both of Ohio

[73] Assignee: Eltech Systems Corporation, Boca Raton, Fla.

[21] Appl. No.: 152,709

[22] Filed: Feb. 5, 1988

[51] Int. Cl.[4] .............................................. C01B 11/02
[52] U.S. Cl. ...................................... 423/478; 204/101
[58] Field of Search ........................ 423/478, 472, 477; 204/101; 210/754

[56] References Cited

U.S. PATENT DOCUMENTS

| | | | |
|---|---|---|---|
| 3,265,526 | 8/1966 | Beer | 117/50 |
| 3,632,498 | 1/1972 | Beer | 204/290 |
| 3,711,385 | 6/1973 | Beer | 204/59 |
| 3,810,969 | 5/1974 | Schlumberger | 423/478 |
| 4,426,263 | 1/1984 | Hardee et al. | 204/101 |
| 4,528,084 | 7/1985 | Beer et al. | 204/290 |

*Primary Examiner*—John Doll
*Assistant Examiner*—Lori S. Freeman
*Attorney, Agent, or Firm*—John J. Freer

[57] ABSTRACT

Chlorine dioxide is generated from chlorate salt and introduced into a treatment stream. Initially following dissolution of the salt in aqueous medium, the solution is subjected to ion exchange for producing intermediate chloric acid. The acid is next converted to chlorine dioxide by electrolysis. The chlorine dioxide produced can then be extracted for use with a treatment stream. The chlorine dioxide generated can be free from unwanted by-products. The total generation system lends itself to recycling of unused product for obtaining virtually complete conversion of chlorate salt to useful chlorine dioxide.

16 Claims, 3 Drawing Sheets

PRODUCING CHLORINE DIOXIDE FROM CHLORATE SALT

BACKGROUND OF THE INVENTION

Chlorine dioxide has been extensively investigated for many years and has found wide use both as a disinfectant and as a chemical oxidizer. It can be applied in a broad range of water treatment applications for each purpose.

One process for producing chlorine dioxide has been by the reaction of a chlorate salt with an acid, e.g., the reaction of sodium chlorate with sulfuric and hydrochloric acids. In this regard there has also been investigated the production of chloric acid from chlorate salts. The chloric acid could then be utilized in various generating systems which produce chlorine dioxide product. These generating systems are well known and are generally well developed commercially, such as for the pulp bleaching industry.

One method for producing chloric acid and subsequently reducing it to produce chlorine dioxide has been disclosed in U.S. Pat. No. 3,810,969. In this patent it is taught that initially chloric acid can be produced by contacting a metal chlorate with an ion exchange resin and thereafter the resulting chloric acid reduced with a conventional reducing agent in a strong mineral acid medium.

More recently, catalytic processes have been investigated for generating chlorine dioxide. Such systems have been researched in regard to employing feedstocks that are aqueous solutions of chlorate salts. Included in these various investigations has been the utilization of an electrochemical cell having active cathodes bearing special electrocatalytic coatings. In U.S. Pat. No. 4,426,263 it has been taught to combine a chlorate compound feedstock with an aqueous strong acid feedstock and to electrolyze the combined material in an electrochemical cell. The cell contains electrocatalytic cathodes that can have a coating of mixed metal oxides. By this process chlorine dioxide is directly prepared from the chlorate salt.

Because of its wide commercial acceptance, it would still be desirable to produce chlorine dioxide efficiently and economically without either deleterious by-products or by-products that are difficult to utilize or dispose of. It also would be highly desirable to provide such a system that could efficiently generate chlorine dioxide while offering economy of recycle to maximize chlorate utilization.

SUMMARY OF THE INVENTION

A system has now been provided which can readily produce chlorine dioxide free from unwanted by-products. Such system can produce only by-products for easy disposal or those adapted for utilization in attendant processing. Moreover, the system is readily adaptable for ease of control. The system is economical, maximizing the use of the chlorate salt. Furthermore, the system can be coupled with a chlorine dioxide extraction process offering efficient extraction with economy of operation.

Broadly, the present invention is directed to the method of producing chlorine dioxide, whereby said chlorine dioxide is provided from a soluble chlorate salt, which method comprises establishing a solution of said chlorate salt in aqueous medium; providing an ion exchange zone including a cation exchanging resin reactable with the cation of said chlorate salt; feeding said aqueous solution of chlorate salt into the ion exchange zone and maintaining said salt within said zone for a time sufficient to react chlorate salt with cation exchange resin and produce chloric acid product; providing an electrochemical cell including an electrocatalytic cathode capable of converting chloric acid to chlorine dioxide; passing said chloric acid product from said ion exchange zone to said electrochemical cell; and electrochemically converting said chloric acid product in said cell, and thereby providing an aqueous solution containing chlorine dioxide.

In another aspect, the invention is directed to flowing the aqueous solution of chlorine dioxide, produced as described hereinabove, to a separating zone, removing the chlorine dioxide from said aqueous solution in said separating zone, introducing same to a treatment stream and recycling separating zone liquid effluent to the aqueous solution of chlorate salt. In a further aspect, the invention is directed to extracting chlorine dioxide from aqueous medium using a porous separator extraction apparatus.

Moreover, the invention is directed to the operation of an electrochemical cell for producing chlorine dioxide from chloric acid wherein the cell is operated with the simplicity of a chloric acid feedstock. In yet another aspect, the invention is directed to the treatment of a liquid with chlorine dioxide whereby the chlorine dioxide has been extracted from a solution produced by processing a chlorate salt through an ion exchange resin and then catalytically converting the chloric acid product obtained by such resin to an aqueous solution containing chlorine dioxide. A still further aspect of the invention involves the direct evolution of chlorine dioxide from an electrochemical cell operating at reduced pressure.

DESCRIPTION OF THE PREFERRED EMBODIMENTS

Although reference hereinbelow may be made to particular salts and acids, e.g., sodium chlorate, it is to be understood that unless otherwise specified, these references are merely illustrative and used only for purposes of convenience. Thus as more specifically detailed further hereinbelow, chlorate salts other than sodium chlorate are contemplated as useful for introduction into the system of the present invention. It is also to be understood that although for purposes of convenience any liquid medium referred to herein will generally be termed an aqueous medium, it is contemplated that such might be tap water or deionized water or the like. In the figures, the same elements in each drawing are identified by the same numeral, for purposes of convenience.

Figure 1:
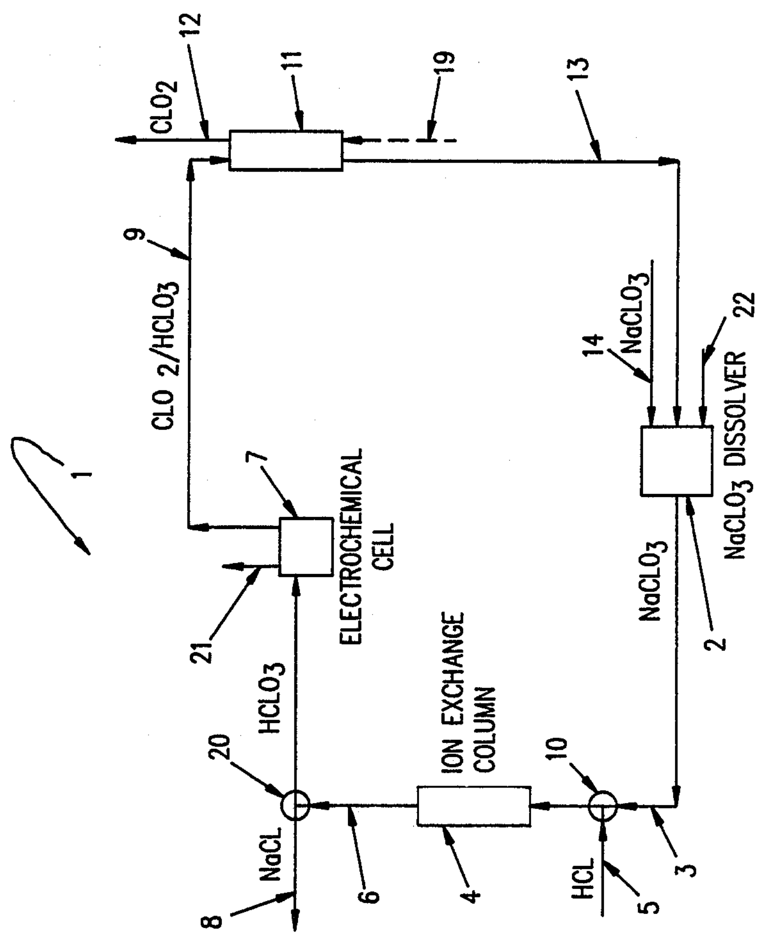
FIG. 1 is a flow diagram depicting the preparation of chlorine dioxide from chlorate salt.

Referring most particularly then to FIG. 1, there is disclosed a system shown generally at 1 for preparing chlorine dioxide using sodium chlorate salt. Fresh sodium chlorate is introduced into a dissolver 2 through a feedline 14. The dissolver 2 can have an additional feed line 22, as for the addition of water or the like. From the dissolver 2 an aqueous solution of sodium chlorate is fed through the dissolver outlet line 3 to a three-way valve 10. This valve 10 opens and shuts the outlet line 3 to an ion exchange column 4. When the valve 10 shuts the outlet line 3, the valve 10 may then open to connect an acid inlet line 5 to the ion exchange column 4, as for use in regenerating the ion exchange resin, not shown, contained in the column 4. From the ion exchange column 4, a column discharge line 6 connects the column 4 to a second three-way valve 20. This valve 20 can be open to permit chloric acid product from the column 4 to be fed to an electrochemical cell 7. Alternatively, when the outlet line 3 three-way valve 10 is open to the acid inlet line 5, the second three-way valve 20 exhausts salt by-product, from the column 4 during the regeneration phase, through a salt by-product withdrawal line 8.

From the electrochemical cell 7, there is a cell product outlet line 9 and a cell gas outlet line 21. The cell product outlet line 9 connects with an extractor 11. The extractor 11 is provided with a chlorine dioxide take-off line 12 as well as a recycle line 13 which leads to the dissolver 2. The extractor can also be equipped with a gas inlet line 19 whereby gas can be introduced to the extractor when chlorine dioxide is stripped from cell product.

In operation, fresh sodium chlorate salt is dissolved in water in the dissolver 2, usually accompanied by agitation and heating. Added water can enter the dissolver 2 through the additional feed line 22. Sodium chlorate solution is then fed from the dissolver outlet line 3 to the first three-way valve 10. When the valve is open to connect the dissolver 2 with the ion exchange column 4, the sodium chlorate solution passes into the ion exchange column 4. Therein the ion exchange resin, not shown, strips the sodium cation from the sodium chlorate salt Producing a column effluent containing chloric acid. The effluent then exits the column 4 through the column discharge line 6. The chloric acid containing effluent proceeds within the column discharge line 6 through the second three-way valve 20 into the electrochemical cell 7. The cell 7 equipped with catalytically active cathodes (not shown) converts chloric acid to chlorine dioxide product.

Chlorine dioxide product from the cell 7 is then fed through the cell product outlet line 9 to an extractor 11. Reaction product oxygen, accompanied by some chlorine dioxide, can exit the cell 7 through the cell gas outlet line 21. From the extractor 11 chlorine dioxide is removed through the take-off line 12. Extraction may be assisted by a gas feed entering the extractor through an extractor gas inlet 19 and thus may be at different pressure, e.g., vacuum operation. Aqueous separator effluent lean in chlorine dioxide and also containing some chloric acid is then fed from the separator 11 through the recycle line 13 back to the dissolver 2.

In operation, the sodium chlorate solution take-off from the dissolver 2 through the dissolver outlet line 3 can be interrupted by the first three-way valve 10. Usually this will occur when the ion exchange resin (not shown) in the column 4 is exhausted. Then hydrochloric acid solution, feeding from a source not shown, can be introduced through the acid inlet line 5 and through the first three-way valve 10 into the dissolver outlet line 3 and from there into the ion exchange column 4 for regenerating the ion exchange resin contained therein. By-product sodium chloride from the regeneration can be removed from the ion exchange column 4 through the column discharge line 6 and thereafter removed from the system 1 by passage through the second three-way valve 20 and on out the salt by-product withdrawal line 8.

Figure 1A:
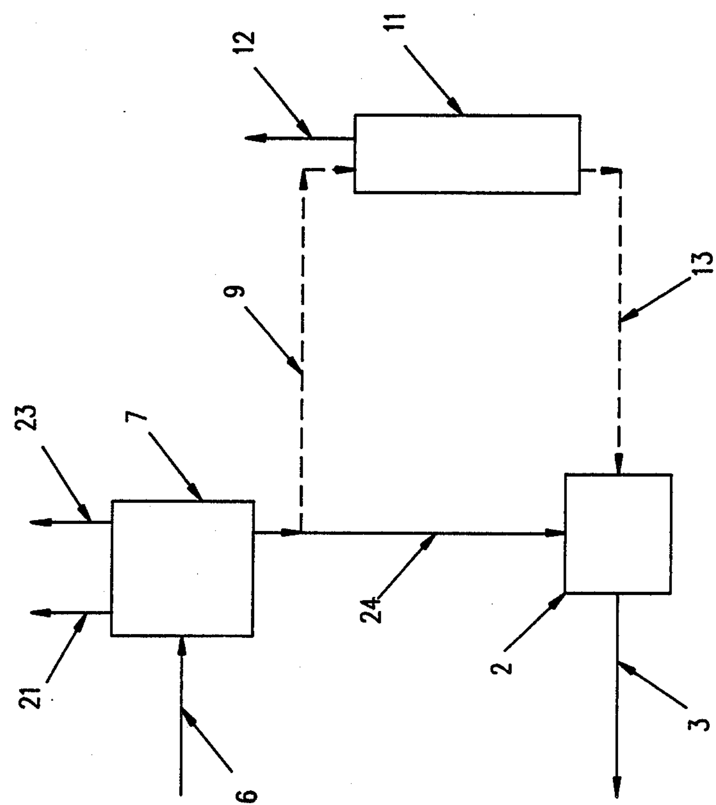
FIG. 1A is a flow diagram showing an option for removing chlorine dioxide product.

Referring to Fig. 1A, there is shown an optional mode for removal of chlorine dioxide product. In this mode, effluent from the ion exchange column, not shown, proceeds through the column discharge line 6 to the electrochemical cell 7. This cell 7, operating at a reduced pressure, e.g., at a pressure within the range from about 100 mm. Hg to about 600 mm. Hg produces a chlorine-dioxide-containing gaseous product. This gaseous product, which can contain come oxygen, is removed directly from the cell 7 through the cell chlorine dioxide outlet line 23. Oxygen produced in the cell 7, e.g., at the anode of a separated cell, can be withdrawn through a cell gas outlet line 21. Cell liquid effluent is withdrawn from the cell 7 through the cell effluent recycle line 24 and fed to the dissolver 2. Since this cell effluent can contain chlorine dioxide, as an option the effluent may be passed through a cell product outlet line 9 to an extractor 11. Therein additional chlorine dioxide can be removed from the cell liquid effluent and the chlorine dioxide thus produced removed from the extractor 11 through the chlorine dioxide take-off line 12. In this operation, the extractor 11 may be equipped with an extractor gas inlet line, not shown and operate at differing pressure, e.g., operate at a reduced pressure. Aqueous separator effluent lean in chlorine dioxide is then fed from the separator through the recycle line 13 back to the dissolver 2. The dissolver 2 is likewise equipped with a dissolver outlet line 3 for circulating an aqueous solution of sodium chlorate to an ion exchange column, not shown.

Figure 2:
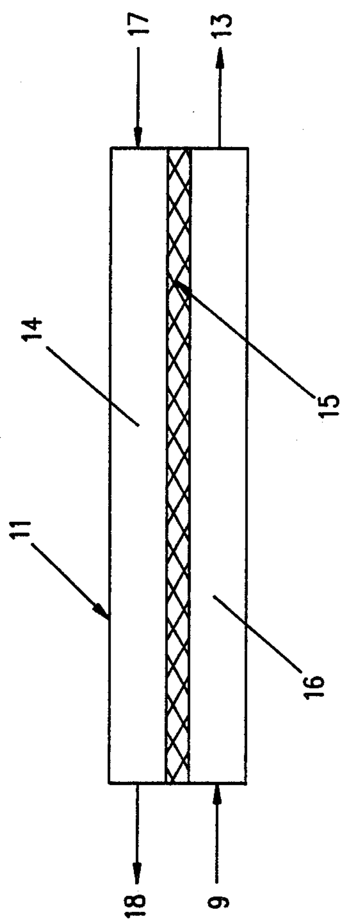
FIG. 2 shows apparatus for introducing chlorine dioxide to a treatment stream from a chlorine-dioxide-containing stream.

Referring then to FIG. 2, there is shown a cell product outlet line 9 connecting to a separator zone 16 of an extractor 11. From this zone 16, opposite the cell product outlet line 9, is a recycle line 13. Also contained within the extractor 11 is a treatment zone 14. This treatment zone is separated from the separator zone 16 by a porous separator 15. Entering the treatment zone 14 is a treatment stream inlet line 17. This treatment zone 14 of the extractor 11 also has a treatment zone take-off line 18.

In operation, the extractor 11 in FIG. 2 has chlorine-dioxide-containing aqueous liquid enter the separator zone 16 through the cell product outlet line 9. In this separator zone 16 chlorine dioxide penetrates into and through the porous separator 15. Effluent from this separator zone 16, lean in chlorine dioxide, then exits the zone 16 through the recycle line 13. Als entering this extractor 11, usually in a countercurrent flow path as shown in the Figure, liquid medium to be treated flows into the treatment zone 14 through the treatment zone entry line 17. Liquid for treatment entering this zone 14 encounters chlorine dioxide penetrating through the porous separator 15 that thereby permeates into the treatment liquid contained in the treatment zone 14. Resulting treated liquid then exits the extractor 11 through the treatment zone take-off line 18.

The chlorate salts utilized for solubilizing in the liquid medium are those containing readily disassociatable cations in solution, and thus cations which can be removed by passage of the solution through ion exchange resin. Most suitably these are the alkali or alkaline earth metal chlorates or their mixtures. Exemplary of these salts are chlorates of lithium, rubidium, cesium, beryllium, magnesium, calcium, strontium, barium , sodium and potassium. Preferably for economy, the chlorate salt utilized is sodium chlorate.

For providing a salt solution for subsequent contact with ion exchange resin, the dissolver can be any equipment suitable for use in dissolution of a solid salt into a liquid medium. For economy, the dissolver can simply be a tank equipped with agitation means, as for example a stirrer. As with the representative sodium chlorate, the salt useful for introduction into the dissolver can be the readily commercially available material. In contemplating the salt to be used, it is well to guard against the introduction of impurities into the system such as transition metal cations which can retard ion exchange activity, as well as metal ions such as from manganese and lead that can harm cell electrode activity. It is also advantageous to avoid introducing impurities which contain chloride ion. Typically commercially available sodium chlorate will contain less than about 0.2 weight percent of chloride-ion-evolving impurities and thus is suitable for utilization by direct addition to the dissolver. In this regard, although the use of tap water is contemplated for preparing the chlorate solution in the dissolver, deionized water for such use is preferred.

The chlorate salt, typically available as a particulate solid, can merely be added to the dissolver in batch operation. Preferably for efficient operation, the chlorate salt and liquid medium are metered to the dissolver in an operation monitored to provide up to a saturated solution of salt in the dissolver, taking into account the content of any recycling substituents feeding to the dissolver from the separator. The concentration of alkali metal chlorate produced in the dissolver is that molar concentration sufficient to provide enough chlorate ions needed to give the corresponding molar concentration of chloric acid in effluent from the ion exchange resin. As a guideline, alkali metal chlorate concentrations from about 0.5 to about 7 molar are operable in producing chloric acid solutions containing from about 0.5 up to about 4.5 molar chloric acid. It is however contemplated that there may be produced in the dissolver a saturated solution of chlorate salt.

For efficiency, the ion exchange resin will most always be present in a column and the chlorate salt solution from the dissolver will be fed to the column generally at or near the top of the column. This liquid containing the solubilized chlorate salt will then come into contact with the ion exchange resin as it proceeds downwardly through the column and the ion exchange effluent will feed from the bottom zone of the column. For purposes of convenience, the word "column" is used herein, although it is to be understood that other configurations for containing the resin can be serviceable.

The useful ion exchange resins present in the column will be the acid form of resins resistant to the conditions of operation, e.g., stable under strong oxidizing conditions. Exemplary resins that can be utilized as the ion exchange resin are the polystyrene based resins and most particularly those which are co-polymerized with divinyl benzene. Serviceable ion exchange resins include Amberlite 200.

Because of the need for regenerating the ion exchange resin, it is contemplated that any one column will always be run intermittently. During interrupted column operation, the ion exchange resin of the column can be regenerated. Thus, two columns in parallel can be utilized for providing a more continuous operation, i.e., one column is being regenerated while a second column is producing chloric acid product. It is advantageous for economy to merely retain the resin in the column and regenerate same by passage through the column of an acid regenerating medium. The acid present in such medium can be any of the acids typically used in such operation including hydrochloric, sulfuric, phosphoric and nitric. In some instances it may be desirable to use sulfuric acid, e.g., where a liquid sodium sulfate by-product can be useful. However, for economy, hydrochloric acid is the regenerating acid of choice. The acid is utilized in aqueous medium at a strength insufficient to degrade the integrity of the ion exchange resin during regeneration. Thus although full strength hydrochloric acid in aqueous medium is desirable for acid economy, preferably for this preferred acid there will be used a regenerating medium of aqueous hydrochloric acid containing from about two to about ten weight percent of the acid.

For the representative sodium chlorate salt and the representative hydrochloric acid, the by-product of regeneration will be sodium chloride. Such can be readily disposed of or find use potentially in systems that may be found in association with the chlorine dioxide production equipment, e.g., a chlorine generator. Usually for efficiency of operation, during interrupted operation, after chlorate salt has been removed and before acid regeneration is initiated, the ion exchange resin will be rinsed. Furthermore, after regeneration, the resin will be rinsed again prior to initiation of further operation with chlorate salt. The use of tap water is serviceable for these rinsings, but preferably for best maintenance of the resin, there will be used deionized water.

The chloric acid containing product from the ion exchange column is then used as feed stock for the electrochemical cell. The cell may be a separated cell, that is, contain a membrane or separator, or will be an unseparated cell having no membrane or separator. For the separated cell, the feedstock for the cell can enter the catholyte chamber. The chambers can be provided by conventional separators or membranes typically useful for cell separation in the chlor-alkali field. Although three compartment cells are contemplated, advantageously for economy the separated cell will be a two compartment cell where the chloric acid feedstock will produce chlorine-dioxide-containing product in the catholyte chamber of the cell. On the anolyte side, it is advantageous that a mineral acid be introduced into the anolyte, and preferably such acid will be sulfuric acid. Products produced in the anolyte chamber, if compatible, may be combined with the material produced during regeneration of ion exchange resin and which material is removed from the column 4 through the salt by-product withdrawal line 8. Preferably for efficient chlorine dioxide generation and economy, the cell will be an unseparated cell.

The cell will have one or more cathodes that are electrocatalytic cathodes or, more usually, have an electrocatalytic coating on a substrate. The catalyst generally comprises one or more of a valve metal oxide, e.g., an oxide of titanium, niobium, zirconium, tin or antimony, combined with one or more platinum group metal oxides. Or it may be provided from platinum or other platinum group metal, or it may be any of a number of active oxide coatings such as the platinum group metal oxides, magnetite, ferrite, cobalt spinel, or mixed metal oxide coatings. It is particularly preferred for extended life of the cell that the cathode, or the coating on the cathode, be a mixed metal oxide, which can be a solid solution of a valve metal oxide and a platinum group metal oxide. The platinum group metal or mixed metal oxides for the coating are such as have generally been described in one or more of U.S. Pat. No. 3,265,526, 3,632,498, 3,711,385 and 4,528,084. More particularly, the oxides of the platinum group metals will be oxides of platinum, palladium, rhodium, iridium and ruthenium or alloys of themselves and with other metals. Mixed metal oxides include at least one of the oxides of these platinum group metals in combination with at least one oxide of a valve metal or another non-precious metal. Where such electrocatalyst is present as a coating, the cathode substrates can be selected from a wide variety of materials including valve metals, other metals, e.g., iron, cobalt, nickel, tin, lead, and chromium, as well as carbon and ceramic substrates. Useful as anodes are the valve metals having an oxygen evolving coating. Such a coating can be provided by metal oxides or mixtures of such oxides as discussed hereinabove.

Since typically the feed stock from the ion exchange column can contain chloric acid at a strength of between about 0.5 molar to about 4.5 molar, or more, such will be the strength of the feed stock entering the cell. As a result of the electrochemical reaction in the cell, the liquid effluent from the cell can be expected to contain chlorine dioxide along with chloric acid. However, liquid effluent can be expected to be virtually to completely free from any undesirable chlorine by-product, e.g., gaseous chlorine. Usually, for economical operation, the electrochemical cell will be operated so as to convert, in continuous recirculating operation of the system, at least about 95 molar percent or more, e.g., up to essentially 100 molar percent, of the chloric acid generated in the cell to chlorine dioxide.

The liquid product from the cell is then used as feed stock to an extractor for removal of chlorine dioxide content. This chlorine dioxide can be stripped from the liquid reaction medium in any usual manner such as by sparging a gas, e.g., nitrogen or air, through the medium or by conventional air-vacuum processing. The extracted chlorine dioxide product may then be useful for direct injection in to a treatment stream . Any oxygen stripped during the extraction can be utilized along with the chlorine dioxide. Care must however be exercised in stripping the chlorine dioxide to avoid elevated pressure, as well as avoid elevated chlorine dioxide concentration, that may pose an explosion hazzard.

One way for reducing such hazzard and for efficiently extracting the chlorine dioxide from the cell liquid reaction medium is to pass such medium into an extractor containing a porous separator or membrane. Such extractor may take the configuration as shown in FIG. 2, i.e., a countercurrent operation with the porous separator situated between the countercurrently flowing liquids. In this scheme, the chlorine-dioxide-containing liquid enters the extractor apparatus and flows along a face of the porous separator. The liquid to be treated flows along the opposite face of the separator. Moreover, it is to be understood that such extractor may be in the configuration of concentric pipes, with the chlorine-dioxide-containing liquid entering at the central pipe, for example. Such extractor can also be in a parallel relationship, e.g., there would be a second porous separator 15 in FIG. 2 at the bottom of the separator zone 16, with then a second, lower treatment zone 14 below the second porous separator 15.

Although countercurrent flow for the treatment stream and the cell liquid reaction medium stream is preferable for most efficient introduction of chlorine dioxide to, and absorption in, the treatment stream, co-current operation is also contemplated. To enhance separation of chlorine dioxide gas from the cell liquid reaction medium while it is in the extractor, it may be desirable to add a salt such as sodium chlorate to the medium or to heat such medium. The separator should have good chemical resistance to the environment of the extractor. Also it is preferably non-wettable, i.e., is made of hydrophobic material such as fluorinated polymer, and has extremely small pore size. For the porous separator, useful materials include microporous polytetrafluoroethylene.

Following chlorine dioxide extraction, the liquid effluent departing the extractor will contain residual chlorine dioxide gas as well as chloric acid and usually some sodium chlorate. Owing to this makeup of the effluent, it is preferred to recycle the effluent to the chlorate dissolver. Any chlorate salt and chloric acid in the extractor effluent can be readily passed to and through the chlorate dissolver for recirculation in the system. Residual chlorine dioxide gas may necessitate venting either the dissolver or the ion exchange column, or both.

Generally, the system in all aspects will be operating at a temperature within the range of from ambient, e.g., 20° C., up to about 95° C. In the dissolver it is advantageous for fast dissolution of chlorate salt into liquid medium that there be an elevated dissolver temperature. Typically the dissolver temperature will be within the range from about 40° C. to about 95° C. and for fast dissolution coupled with economy will be within the range from about 40° C. to about 60° C. It is contemplated that the ion exchange column will most always operate at the temperature provided by the solution feedstock from the dissolver. So long as the resin present in the column is not sensitive to elevated temperature, the column can thus operate within the general system guidelines, i.e., from ambient up to 90° C. Usually, some cooling of the solution from the dissolver will take place during feeding of the solution to the column and passage through the column. Thus it can be expected that the column effluent will be at a slightly reduced temperature from the feedstock, and such will not be deleterious.

It is likewise serviceable for the electrochemical cell to operate within the general system guidelines of from ambient to 90° C. Usually, although some cooling effect may take place between the dissolver and the electrochemical cell, there will be heat input to the solution medium during cell operation. Such is however usually minimal. Effluent from the extractor will usually be of sufficiently elevated temperature such that its recycle to the dissolver will provide for efficient dissolution of added chlorate salt without further heat input. Generally for best electrochemical conversion of chloric acid to chlorine dioxide as well as most extended operation of the ion exchange column without deleterious degradation, it is advantageous that these portions of the system operate at a temperature within the range from about 20° C. to about 60°. Preferably, for economy as well as efficient operation, such are operated at a temperature within the range of from about 20° C. to about 40° C. Because of this, such temperature ranges may be utilized throughout the system.

It is suitable for the dissolver to be constructed of any of those materials generally useful in equipment for dissolving a salt in aqueous medium, e.g., steel or stainless steel tanks, agitators and the like. For the ion exchange column, as chloric acid will be produced therein, suitable materials of construction of the column include glass lined columns or plastic lined columns, e.g., of polypropylene or polytetrafluorethylene. Likewise, for the electrochemical cell, as well as for the extractor, it is typical to construct such apparatus out of these same or similar materials.

It is contemplated that it may be useful to employ, in place of the electrochemical cell, a catalytic reactor. Such an alternative to the cell can also be useful for converting chloric acid to chlorine dioxide. Where such catalytic reactor is utilized, catalysts that may be employed include those that have been discussed hereinabove as suitable for use as cathode coatings for the electrochemical cell. Usually for best conversion efficiency the catalytic reactor will be operated at a slightly more elevated temperature than for the electrochemical cell. Thus where such a reactor is employed, it can be useful to heat the ion exchange column effluent prior to introduction into the catalytic reactor. Where a catalytic reactor is employed, preferably for best efficiency of chlorine dioxide production, the reactor will be operated at a temperature within the range of from about 60° C. to about 90° C.

We claim:

1. The method of producing chlorine dioxide, whereby said chlorine dioxide is provided from a soluble chlorate salt, which method comprises:

(a) establishing a solution of said chlorate salt in aqueous medium;

(b) providing an ion exchange zone including a cation exchanging resin reactable with the cation of said chlorate salt;

(c) feeding said aqueous solution of chlorate salt into the ion exchange zone and maintaining said salt within said zone for a time sufficient to react chlorate salt with cation exchange resin and produce chloric acid product;

(d) providing an electrochemical cell including an electrocatalytic cathode capable of converting chloric acid to chlorine dioxide;

(e) passing said chloric acid product from said ion exchange zone to said electrochemical cell; and (f) electrochemically converting said chloric acid product in said cell, and thereby providing an aqueous solution containing chlorine dioxide.

2. The method of claim 1, wherein said chlorate salt solution is established in aqueous medium at a temperature within the range of from about 5°-40° C. with one or more of an alkali metal or alkaline earth metal salt.

3. The method of claim 1, wherein said solution of chlorate salt is fed to said ion exchange zone intermittently and when the feeding of said solution is interrupted said resin is regenerated with mineral acid.

4. The method of claim 1, wherein said chloric acid is converted by passing same in said cell in contact with electrodes bearing an electrocatalytic coating.

5. The method of claim 1, wherein said chloric acid is electrochemically converted at a temperature within the range of from about 20° C. to about 90° C.

6. The method of claim 1, wherein said method further comprises (g) flowing said aqueous solution of chlorine dioxide from step (f) to a separating zone; (h) removing the chlorine dioxide from said aqueous solution in said separating zone and introducing same to a treatment stream; and (i) recycling separating zone liquid effluent to said aqueous solution of chlorate salt.

7. The method of claim 1, wherein said chlorine dioxide is removed from said aqueous solution in said separating zone by stripping.

8. The method of claim 1, wherein said chlorine dioxide is removed from said aqueous solution in said separating zone by permeation through a hydrophobic permeable separator.

9. The method of claim 1, wherein said electrochemical cell is maintained free from introduction of additional reactants other than said chloric acid product from said ion exchange zone.

10. The method of claim 1, wherein said chloric acid product is passed to a catholyte chamber of a separated cell and aqueous solution of chlorine dioxide is removed from said catholyte chamber.

11. In the method of electrocatalytically producing chlorine dioxide from an aqueous solution containing a chlorate wherein said chlorate-containing solution is introduced into an electrochemical cell containing at least one electrocatalytic cathode, the improvement comprising introducing into said cell an aqueous feedstock containing chloric acid while maintaining all cell feed streams free of additional acid and withdrawing from said cell an aqueous solution containing chlorine dioxide in acidic aqueous medium containing, as acid, only chloric acid.

12. The method of treating a liquid with chlorine dioxide, whereby said chlorine dioxide is provided from a soluble chlorate salt, which method comprises:

(a) establishing a solution of said chlorate salt in aqueous medium;

(b) providing an ion exchange zone including cation exchanging resin reactable with the cation of said chlorate sale;

(c) feeding said aqueous solution of chlorate salt into the ion exchange zone and maintaining said salt within said zone for a time sufficient to react chlorate salt with cation exchange resin and produce chloric acid product;

(d) providing a catalytic reactor including a catalyst capable of converting chloric acid to chlorine dioxide;

(e) passing said chloric acid product from said ion exchange zone to said catalytic reactor;

(f) catalytically converting said chloric acid product in said reactor, and thereby providing an aqueous solution containing chlorine dioxide;

(g) flowing the aqueous solution of chlorine dioxide to a separating zone; and (h) removing the chlorine dioxide from said aqueous solution in said separating zone and introducing same to a treatment stream.

13. The method of treating a liquid with chlorine dioxide, whereby said chlorine dioxide is provided from a soluble chlorate salt, which method comprises:

(a) establishing a solution of said chlorate salt in aqueous medium;

(b) providing an ion exchange zone including a cation exchanging resin reactable with the cation of said chlorate salt;

(c) feeding said aqueous solution of chlorate salt into the ion exchange zone and maintaining said salt within said zone for a time sufficient to react chlorate salt with cation exchange resin and produce chloric acid product;

(d) providing an electrochemical cell including an electrocatalytic cathode capable of converting chloric acid to chlorine dioxide;

(e) passing said chloric acid product from said ion exchange zone to said electrochemical cell; and (f) electrochemically converting said chloric acid product in said cell, and thereby providing a chlorine dioxide product.

14. The method of claim 13, wherein said electrochemical cell produced gaseous effluent and said method further comprises (g) removing said chlorine dioxide product from said electrochemical cell in said gaseous effluent and introducing same to a treatment system.

15. The method of claim 14, wherein said electrochemical cell produces liquid effluent and said method further comprises (h) recycling electrochemical cell liquid effluent to said aqueous solution of chlorate salt.

16. The method of claim 15, wherein at least a portion of said liquid effluent is passed to a separating zone for removal of chlorine dioxide and liquid effluent from said separating zone is recycled to said aqueous solution of chlorate salt.

* * * * *